United States Patent [19]

Smith

[11] E Re. 31,450

[45] Reissued Nov. 29, 1983

[54] METHOD AND STRUCTURE FOR FLOW MEASUREMENT

[75] Inventor: James E. Smith, Boulder, Colo.

[73] Assignee: Micro Motion, Inc., Boulder, Colo.

[21] Appl. No.: 348,071

[22] Filed: Feb. 11, 1982

Related U.S. Patent Documents

Reissue of:

[64] Patent No.: 4,187,721
Issued: Feb. 12, 1980
Appl. No.: 926,468
Filed: Jul. 20, 1978

U.S. Applications:

[63] Continuation-in-part of Ser. No. 818,475, Jul. 25, 1977, abandoned.

[51] Int. Cl.[3] ..... G01F 1/86

[52] U.S. Cl. ..... 73/861.38; 73/434

[58] Field of Search ..... 73/32 A, 434, 505, 861.18, 73/861.35, 861.37, 861.38

[56] References Cited

U.S. PATENT DOCUMENTS

| | | | |
|---|---|---|---|
| 2,624,198 | 1/1953 | Pearson . | |
| 2,635,462 | 4/1953 | Poole et al. | 73/32 |
| 2,753,173 | 7/1956 | Barnaby et al. | 264/1 |
| 2,754,676 | 7/1956 | Poole et al. | 73/32 |
| 2,804,771 | 9/1957 | Brown | 73/228 |
| 2,811,854 | 11/1957 | Powers . | |
| 2,813,423 | 11/1957 | Altfillisch et al. . | |
| 2,821,084 | 1/1958 | Altfillisch et al. . | |
| 2,831,349 | 4/1958 | Altfillisch et al. . | |
| 2,834,209 | 5/1958 | Jones et al. . | |
| 2,865,201 | 12/1958 | Roth . | |
| 2,877,649 | 3/1959 | Powers . | |
| 2,889,702 | 6/1959 | Brooking | 73/32 |
| 2,897,672 | 8/1959 | Glasbrenner et al. | 73/228 |
| 2,914,945 | 12/1959 | Cleveland . | |
| 2,923,154 | 2/1960 | Powers et al. . | |
| 2,934,951 | 5/1960 | Li . | |
| 2,943,476 | 7/1960 | Bernstein | 73/32 |
| 2,943,487 | 7/1960 | Potter . | |
| 2,956,431 | 10/1960 | Westerheim | 73/32 |
| 3,039,310 | 6/1962 | Copland et al. | 73/434 |
| 3,044,302 | 7/1962 | Knauth | 73/434 |
| 3,049,917 | 8/1962 | Alspach et al. . | |
| 3,049,919 | 8/1962 | Roth | 73/228 |
| 3,080,750 | 3/1963 | Wiley et al. . | |
| 3,087,325 | 4/1963 | Roth | 73/3 |
| 3,096,646 | 7/1963 | Peirce | 73/228 |
| 3,108,475 | 10/1963 | Henderson . | |
| 3,132,512 | 5/1964 | Roth . | |
| 3,138,955 | 6/1964 | Uttley . | |
| 3,164,017 | 1/1965 | Karlby et al. . | |
| 3,167,691 | 1/1965 | Halista | 317/157 |
| 3,218,851 | 11/1965 | Sipin . | |
| 3,232,110 | 2/1966 | Li . | |
| 3,251,226 | 5/1966 | Cushing | 73/861.63 X |
| 3,261,205 | 7/1966 | Sipin . | |
| 3,276,257 | 10/1966 | Roth . | |
| 3,276,258 | 10/1966 | Rowley . | |
| 3,298,221 | 1/1967 | Miller et al. | 73/32 |
| 3,303,705 | 2/1967 | Dostal | 73/505 |
| 3,320,791 | 5/1967 | Banks | 73/32 |
| 3,329,019 | 7/1967 | Sipin . | |
| 3,339,400 | 9/1967 | Banks | 73/32 |
| 3,344,666 | 10/1967 | Rilett . | |
| 3,349,604 | 10/1967 | Banks | 73/32 |
| 3,350,936 | 11/1967 | Li . | |
| 3,355,944 | 12/1967 | Sipin . | |
| 3,385,104 | 5/1968 | Banks . | |
| 3,396,579 | 8/1968 | Sourian . | |
| 3,449,940 | 6/1969 | Banks | 73/32 |
| 3,449,941 | 6/1969 | Banks | 73/32 |
| 3,456,491 | 7/1969 | Brockhaus | 73/32 |
| 3,481,509 | 12/1969 | Marhauer . | |
| 3,485,098 | 12/1969 | Sipin . | |
| 3,533,285 | 10/1970 | Dee . | |
| 3,555,900 | 1/1971 | Bauer et al. . | |
| 3,575,052 | 4/1971 | Lenker . | |
| 3,584,508 | 6/1971 | Shiba . | |
| 3,589,178 | 6/1971 | Germann . | |
| 3,608,374 | 9/1971 | Miller . | |
| 3,613,451 | 10/1971 | Scott . | |
| 3,625,055 | 12/1971 | LaFourcade . | |
| 3,677,086 | 7/1977 | Corey . | |
| 3,688,574 | 9/1972 | Arutunian et al. . | |
| 3,728,893 | 4/1973 | Janssen | 73/32 |
| 3,740,586 | 6/1973 | Banks et al. . | |
| 3,762,217 | 10/1973 | Hagen . | |
| 3,839,915 | 10/1974 | Schlitt . | |
| 3,842,681 | 10/1974 | Mumme . | |
| 3,876,927 | 4/1975 | Gee et al. . | |
| 3,897,766 | 8/1975 | Pratt, Jr. et al. . | |
| 3,927,565 | 12/1975 | Pavlin et al. . | |

| | | | |
|---|---|---|---|
| 3,955,401 | 5/1976 | Catherall | 73/32 A |
| 4,051,723 | 10/1977 | Head et al. . | |
| 4,056,976 | 11/1977 | Hildebrand . | |
| 4,109,524 | 8/1978 | Smith . | |
| 4,127,028 | 11/1978 | Cox et al. | 73/861.38 |

FOREIGN PATENT DOCUMENTS

| | | |
|---|---|---|
| 2249269 | 4/1974 | Fed. Rep. of Germany . |
| 2145387 | 2/1975 | France . |
| 32-6595 | 8/1957 | Japan . |
| 44-18531 | 8/1969 | Japan . |
| 46-19827 | 6/1971 | Japan . |
| 117091 | 5/1958 | U.S.S.R. . |
| 146982 | 4/1961 | U.S.S.R. . |
| 149900 | 11/1961 | U.S.S.R. . |
| 159678 | 12/1963 | U.S.S.R. . |
| 171651 | 5/1965 | U.S.S.R. . |
| 400838 | 10/1973 | U.S.S.R. . |
| 426170 | 4/1974 | U.S.S.R. . |
| 486247 | 9/1975 | U.S.S.R. . |

OTHER PUBLICATIONS

A. Treatise; *Continuous Measurement of Unsteady Flow,* by G. P. Katys, translated from the Russian by D. P. Barrett, MacMillan Company, New York, 1964.

*Primary Examiner*—Jerry W. Myracle
*Attorney, Agent, or Firm*—Irons & Sears

[57] ABSTRACT

Apparatus and method for mass flow measurement utilizing a substantially "U" shaped conduit mounted in a cantilever manner at the legs thereof, [means for oscillating the conduit, and means for measuring] *so that, when the conduit is oscillated, sensors mounted on the conduit can measure* the Coriolis force by measurement of the force moment or the angular motion of the conduit around an axis substantially symmetrical to the legs of the conduit. The force moment is measured by sensing incipient movement around the axis, and generating and measuring a nulling force. In preferred embodiments, the oscillating means are mounted on a spring arm having a natural frequency substantially equal to that of the "U" shaped conduit, and in a particularly preferred [displacement] *embodiment* the measuring [means are sensors] *sensors are* mounted on the "U" shaped conduit and adapted to measure, with proper direction sense, the time differential between the leading and trailing portions of the "U" shaped conduit passing through the plane of the "U" shaped conduit at substantially midpoint of the oscillation thereof.

55 Claims, 14 Drawing Figures

METHOD AND STRUCTURE FOR FLOW MEASUREMENT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a flow measuring device, and more particularly to a flow measuring device in the form of a "U" shaped conduit mounted in beamlike, cantilevered, fashion and arranged to determine the density of a fluid material in the conduit, the mass flow rate therethrough, and accordingly other dependent flow parameters.

2. Description of the Prior Art

Heretofore, flow meters of the general type with which the present invention is concerned have been known as gyroscopic mass flow meters, or Coriolis force mass flow meters. In essence, the function of both types of flow meters is based upon the same [principal] *principle*.

Viewed in a simplified manner, Coriolis forces involve the radial movement of mass from a first point on a rotating body to a second point. As a result of such movement, the peripheral velocity of the mass changes, i.e., the mass is accelerated. The acceleration of the mass generates a force in the plane of rotation and perpendicular to the instantaneous radial movement. Such forces are responsible for precession in gyroscopes.

Several approaches have been taken in utilizing Coriolis forces to measure mass flow. For instance, the early Roth U.S. Letters Pat. Nos. 2,865,201 and [3,312,512] *3,132,512* disclose gyroscopic flow meters employing a full loop which is continuously rotated (DC type) or oscillated (AC type).

Another flow meter utilizing substantially the same forces but avoiding reversal of flow by utilizing a less than 180° "loop" is described in Sipin U.S. Letters Pat. No. 3,485,098. In both instances, the devices are of the so called AC type, i.e., the conduit is oscillated around an axis and fluid flowing through the conduit flows first away from the center of rotation and then towards the center of rotation thus generating Coriolis forces as a function of the fluid mass flow rate through the loop.

Since there is but one means of generating Coriolis forces, all of the prior art devices of the gyroscopic and Coriolis force configurations generate the same force, but specify various means for measuring such forces. Thus, though the concept is simple and straightforward, practical results in the way of accurate flow measurement have proven elusive.

For instance, the Roth flow meters utilize transducers or gyroscopic coupling as readout means. The gyroscopic coupling is described in Roth as being complex, and transducers are defined as requiring highly flexible conduits, such as bellows. The latter mentioned Roth patent is primarily concerned with the arrangement of such flexible bellows.

Another classical approach for measuring the force proportional to mass flow involve first driving or oscillating a conduit structure through a rotational movement around an axis, and then measuring the additional energy required to drive such conduit as fluid [is flowed] *flows* through the conduit. Unfortunately, the Coriolis forces are quite small compared to the driving forces and, accordingly, it is quite difficult to accurately measure such small forces in the context of the large driving force.

Still another measurement means is described by Sipin at column 7, lines [1 through 23] *11 through Column 8, line 16* of U.S. Letters Pat. No. 3,485,098. In this arrangement velocity sensors independent of the driving means are mounted to measure the velocity of the conduit as a result of the distortion of the conduit caused by Coriolis forces. While there may be worthwhile information obtained by such measurements, velocity sensors require measurement of a minute differential velocity superimposed upon the very large pipe oscillation velocities. Thus an entirely accurate [determinate] *determination* of the gyroscopic force must deal with velocity measurements under limited and specialized conditions as discussed below. Mathematical analysis confirms that velocity measurements provide at best marginal results.

If the Coriolis force is not to produce movements of great amplitude, clearly, as a basic precept of physics, a reactive force, or forces, must oppose the Coriolis force. Put simply, the Coriolis force, particularly in the flow meter arrangements permitting distortion of the conduit (a qualification which will be explained below), is opposed by, stated simply, the spring resistance of the conduit itself as it distorts, plus velocity forces resulting from movement of the conduit, i.e., air drag, etc. —usually a small component —and an inertial component resulting from the acceleration of the mass of the conduit. It is a complex endeavor to concurrently measure and sum all three of these opposing forces. Accordingly, it is understandable that Sipin measures but one of the forces, i.e., velocity[, forces]. Given the rather involved and marginally accurate conventional mass flow measuring devices utilizing, for instance, independent densities and flow [velocities] *velocity* sensors, it is understandable that measurement of a single opposing force such as velocity by Sipin would produce useful though compromised information. If only velocity related reactive forces are to be measured, the other normally more substantially reactive forces should be minimized. This is not the case in the apparatus illustrated by Sipin. No discussion of this critical consideration is to be found.

Another approach to the problem of measuring the small Coriolis forces is described in my U.S. Letters Patent Application Ser. No. 591,907, for "METHOD AND APPARATUS FOR MASS FLOW MEASUREMENT", filed June 30, 1975 now U.S. Pat. No. [4,109,529] *4,109,524*.

In an embodiment of my prior approach, rather than attempting to measure the opposing forces to the Coriolis forces, all of which are dependent upon displacement of the conduit, I describe an arrangement in which a mechanical nulling force, i.e., an opposing force which precludes displacement, is produced. Accordingly, any infinitesimal incremental displacement of the conduit is sensed and opposing force generated. By measuring the opposing force, which replaces the inherent opposing forces described above, an accurate measurement of the mass flow may be made, though at the complication of avoiding spurious measurements of forces resulting from driving the conduit. My application described two independent means for avoiding such complicating forces, i.e., balancing the forces on opposite sides of a beam to cancel the forces and measuring the Coriolis force at maximum angular velocity when driving acceleration forces and bellows spring forces are zero. The balancing approach in conjunction with nulling required relatively slow operation to accomodate the response time of the mechanical beam.

In summary, numerous attempts have heretofore been made to measure mass flow as a function of the Coriolis forces generated by mass flow through an oscillating conduit. However, accurate measurements have been possible only when the conduit displacement is nulled while balancing [theacceleration] *the acceleration* forces due to driving the conduit, and only approximate measurements made when the conduit is allowed to distort against inherent restoration forces such as spring resistance in the conduit, velocity drag factors and inertia while making such measurements.

SUMMARY OF THE INVENTION

The present invention, which provides a heretofore unavailable improvement over previous mass flow measuring devices, comprises a substantially continuous "U" shaped tube mounted in beam-like fashion, i.e., without flexible or separate pivoting sections, means for oscillating the conduit and means for measuring the resulting Coriolis force by measuring the force moment due to the Coriolis forces, or the angular distortion of the conduit as a result of such Coriolis forces. Preferably, the [oscillatiogn] *oscillation* means are mounted on a separate arm having a natural frequency substantially that of the "U" shaped tube. Accordingly, the two members oscillate in opposite phase similar to the manner in which the tines of a tuning fork oscillate and like a tuning fork, cancel vibrations at the support. In a particularly preferred embodiment, the distortion of the "U" shaped conduit is measured by sensors positioned adjacent the intersections of the base and legs of the conduit which measure the time lag between the leading and trailing edges of the conduit *passing* through the nominal central point of oscillation as a result of distortion by the Coriolis forces. This arrangement avoids the need to control the frequency and/or amplitude of oscillation.

The cantilevered beam-like mounting of the "U" shaped conduit is of more than passing significance. In the instance in which distortion is measured, such mounting provides for the distortion resulting from the Coriolis forces to be offset substantially entirely by resilient deformation *forces* within the conduit free of mechanical pivot means other than flexing of the conduit. By minimizing [draft] *drag* and inertial inputs, measurement of but one of the three opposing forces generates highly accurate determinations. Thus rather than compromising the accuracy of the flow meters by measuring but one of the opposing forces, the method and apparatus of the present invention is specifically structured to minimize or obviate the forces generated by the two non-measured opposing forces, i.e., velocity drag and acceleration of mass. This effort has been successful to the point where such forces are present in cumulative quantities of less than 0.2% of the torsional spring force. Also, by mounting the conduit in a beam-like fashion, which pivots by beam bending, the need for bellows and other such devices which are reactive to the differences in pressure between the conduit and ambient pressure are entirely avoided. Pivoting is accomplished free of pressure sensitive, separate pivot means.

Accordingly, it is an object of the present invention to provide a new and improved apparatus and method for measuring mass flow which provides highly accurate measurement with simple, low cost construction.

Another object of the present invention is to provide a new and improved apparatus for measuring mass flow which is substantially insensitive to pressure difference between ambient pressure and the fluid being measured.

Yet another object of the present invention is to provide a new and improved apparatus and method for measuring mass flow which measures substantially all of the displacement forces generated by Coriolis forces.

Still another object of the present invention is to provide a new and improved apparatus and method for measuring fluid mass flow which is capable of accurate measurement of the mass flow of gases.

Yet still another object of the present invention is to provide a new and improved apparatus and method for measuring mass flow which is capable of accurately determining the mass flow of fluidized mixtures of solids and gases.

Still yet another object of the present invention is to provide a new and improved apparatus and method for measuring fluid flow substantially independent of pressure, temperature and viscosity variations.

DETAILED DESCRIPTION OF THE INVENTION

Figure 1:
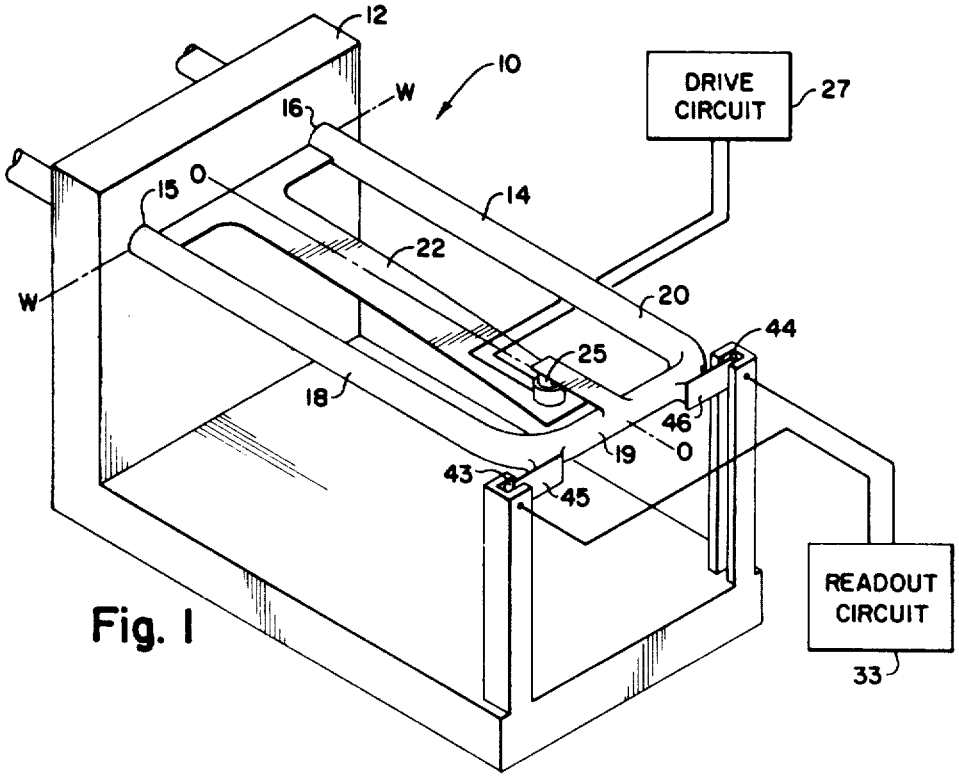
FIG. 1 is a perspective view of a fluid flow meter according to one embodiment of the present invention.

Turning now to the drawings, wherein like components are designated by like reference numerals throughout the various figures, a flow meter device according to a first embodiment of the present invention is illustrated in FIG. 1 and generally designated by reference numeral 10. Flow meter 10 includes fixed support 12 having "U" shaped conduit 14 mounted thereto in a cantilever, beam-like fashion. "U" shaped conduit 14 is preferably of a tubular material having resiliency such as is normally found in such materials such as beryllium, copper, tempered aluminum, steel, plastics, etc. Though described as "U shaped", conduit 14 may have legs which converge, diverge, or are skewed substantially. A continuous curve is contemplated. Preferably, "U" shaped conduit 14 includes inlet 15 and outlet 16 which in turn are connected by inlet leg 18, base leg 19 and outlet leg 20. Most preferably, inlet leg 18 and outlet leg 20 are parallel, and base leg 19 is perpendicular to both; but, as mentioned above, substantial deviations from the ideal configuration, i.e., 5° convergence or divergence do not appreciably compromise results. Operable results may be obtained with even gross deviations on the order of 30° or 40°, but, since little is gained from such deviations in the embodiment of concern, it is generally preferred to maintain inlet leg 18 and outlet leg 20 in a substantially parallel relationship. Conduit 14 may be in the form of a continuous or partial curve as is convenient.

Though the physical configuration of "U" shaped conduit 14 is not critical, the frequency characteristics are important. It is critical in the embodiment of FIG. 1 which permits distortion that the [resonent] *resonant* frequency around axis W—W be different than that around axis O—O, and most preferably that the resonant frequency [abut] *about* axis W—W be the lower resonant frequency.

Spring arm 22 is mounted to inlet and outlet legs 18 and 20, and carries force coil 24 and sensor coil 23 at the end thereof adjacent base leg 19. Magnet 25, which fits within force coil 24 and sensor coil 23, is carried by base leg 19, Drive circuit 27, which will be discussed in more detail below, is provided to generate an amplified force in response to sensor coil 23 to drive "U" shaped conduit 14 at its natural frequency around axis W—W in an oscillating manner. Though "U" shaped conduit 14 is mounted in a beamlike fashion to [supports] *support* 12, the fact that it is oscillated at resonant frequency permits appreciable amplitude to be attained in the "beam" oscillation mode around axis W—W. "U" shaped conduit 14 essentially pivots around axis W—W at inlet 15 and outlet 16.

As a preferable embodiment, first sensor [32] *43* and second sensor 44 are supported at the intersections of base leg 19 and inlet leg 18 and outlet leg 20, respectively. Sensors 43 and 44 which are preferably optical sensors, but generally proximity or center crossing sensors, are activated as "U" shaped conduit 14 passes through a nominal reference plane at approximately the mid-point of the "beam" oscillation. Readout circuit 33, as will be described below, is provided to indicate mass flow measurements as a function of the time differential of the signals generated by sensors 44 and 43.

Figure 2:
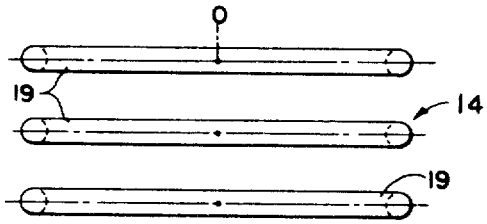
FIG. 2 is an end view of the flow meter of FIG. 1 illustrating oscillation at midpoint under no flow conditions.
Figure 4:
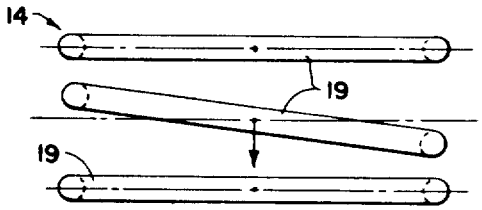
FIG. 4 is an end view of the flow meter of FIG. 1 illustrating oscillation at midpoint in the down direction under flow conditions.
Figure 3:
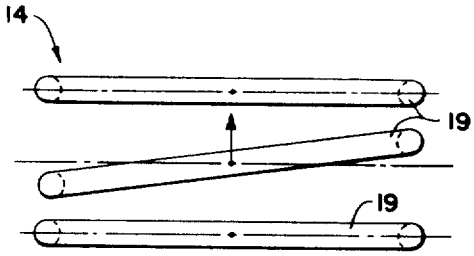
FIG. 3 is an end view of the flow meter of FIG. 1 illustrating oscillation at midpoint in the up direction under flow conditions.

Operation of flow meter 10 will be more readily understood with reference to FIGS. 2, 3 and 4, which, in a simplified manner, illustrate the basic [principal] *principle* of the instant invention. When conduit 14 is oscillated in a no flow condition, inlet leg 18 and outlet leg 20 bend at axis W—W essentially in a pure beam mode, i.e., without torsion. Accordingly, as shown in FIG. 2, base leg 19 maintains a constant angular position around axis O—O throughout the oscillation. However, when flow is initiated, fluid moving radially from axis W—W through inlet leg 18 generates a first Coriolis force perpendicular to the direction of flow and perpendicular to axis W—W while flow in the outlet leg 20 generates a second Coriolis force again perpendicular to the radial direction of flow, but in an opposite direction to that of the first Coriolis force since flow is in the opposite direction. Accordingly, as shown in FIG. 3, as base leg 19 passes through the mid-point of the oscillation. the Coriolis forces generated in inlet leg 18 and outleg leg 20 impose a force couple on "U" shaped conduit 14 thereby rotating base leg 19 angularly around axis O—O. The distortion is both a beam bending distortion and a torsional distortion essentially in inlet leg 18 and outlet leg 20. As a result of the choice of frequencies and the configuration of "U" shaped conduit 14, essentially all of the resistive force to the Coriolis force couple is in the nature of a resilient spring distortion, thereby obviating the need to and complication of measuring velocity drag restorative forces and inertial opposing forces. Given a [sustantially] *substantially* constant frequency and amplitude, measurement of the angular distortion of base leg 19 around axis O—O at the nominal midpoint of the oscillation, provides an accurate indication of mass flow. This provides a substantial improvement over the prior art. However, as a most significant aspect of the present invention, determination of the distortion of base leg 19 relative to the nominal undistorted mid-point plane around axis O—*O* in terms of the time difference between the instant the leading leg, i.e., the inlet leg in the case of FIG. 3, passes through the midpoint plane and the trailing leg, i.e., the outlet leg in the case of FIG. 3, passes such plane, avoids the necessity of maintaining constant frequency and amplitude since variations in amplitude are accompanied by compensating variations in the velocity of base leg 19. Accordingly, by merely driving "U" shaped conduit 14 at its resonant frequency, time measurements may be made in a manner which will be discussed in further detail below, without concern for [conccurrent] *concurrent* regulation [or] *of frequency and* amplitude. However, if measurements are made in but one direction, i.e., the up direction in FIG. 3, it would be necessary to maintain an accurate alignment of base leg 19 relative to the nominal midpoint plane. Even this requirement may be avoided by, in essence, subtracting the time measurements in the up direction shown in FIG. 3, and in the down direction shown in FIG. 4. As is readily recognized by one skilled in the art, movement in the down direction, as in FIG. 4, reverses the direction of the Coriolis force couple and accordingly, as shown in FIG. 4, reverses the direction of distortion as a result of the Coriolis force couple.

Summarily, stated broadly, "U" shaped conduit 14, having specified frequency characteristics though only general physical configuration characteristics, is merely oscillated around axis W—W. Flow through "U" shaped conduit 14 induces spring distortion in "U" shaped conduit 14 resulting, as a convenient means of measurement, in angular movement of base leg 19 around axis O—O initially in a first angular direction during one phase of the oscillation, and, then in the opposite direction during the other phase of oscillation. Though, by controlling amplitude, flow measurements may be made by direct measurement of distortion, i.e., strobe lighting the base leg 19 at the midpoint of oscillation with, for instance, an analogue scale fixed adjacent to end portions and a pointer carried by base leg 19, a preferred mode of measurement involves determining the time difference between the [instance] *instants* in which the leading and trailing edges of the base leg 19 move through the midpoint plane. This avoids the need to control amplitude. Further, by measuring the up oscillation distortions and the down oscillation distortions in the time measurement mode, anomalies resulting from physical misalignment of "U" shaped conduit 14 relative to the midpoint plane are cancelled from the measurement results.

The essentially conventional —given the above discussion of the purposes of the invention —electronic aspects of the invention will be more readily understood with reference to FIGS. 5 through 8.

Figure 5:
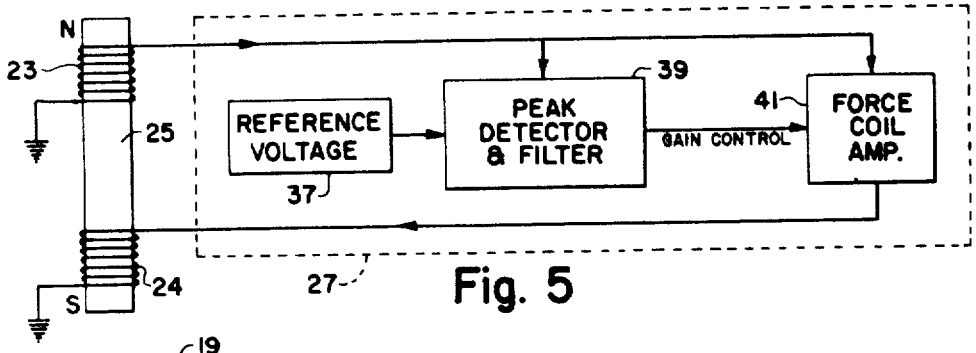
FIG. 5 is a block diagram drawing of the drive circuit of the flow meter of FIG. 1.

As shown in FIG. 5, drive circuit 27 is a simple means for detecting the signal generated by movement of magnet 25 in sensor coil 23. Detector 39 compares the voltage provided by sensor coil 23 with reference voltage 37. As a result, the gain of force coil amplifier 41 is a function of the velocity of magnet 25 within sensor coil 23. Thus, the amplitude of the oscillation of "U" shaped conduit 14 is readily controlled. Since "U" shaped conduit 14 and spring arm 22 are permitted to oscillate at their resonant frequencies, frequency control is not required.

The circuitry of FIG. 5 provides additional information. The output of force coil amplifier 41 is a sinusoidal signal at the resonant frequency of "U" shaped conduit 14. Since the resonant frequency is determined by the spring constant and mass of the oscillating system, and given the fact that the spring constant is fixed and the mass changes only as the density of the fluid flowing through the conduit (the conduit mass clearly does not change), it will be appreciated that any change in frequency is a function of the change in density of the fluid flowing through the conduit. Thus, since the time period of the oscillation can be determined, it is a simple matter to count a fixed frequency oscillator during the time period to determine a density factor. Once generated, the density factor can be converted to fluid density by, for instance, a chart or graph in that the time period is not a linear function of density, but only a determinable function thereof. Should a direct readout be desired, a microprocessor can be readily programmed to convert the density factor directly to fluid density.

Figure 6:
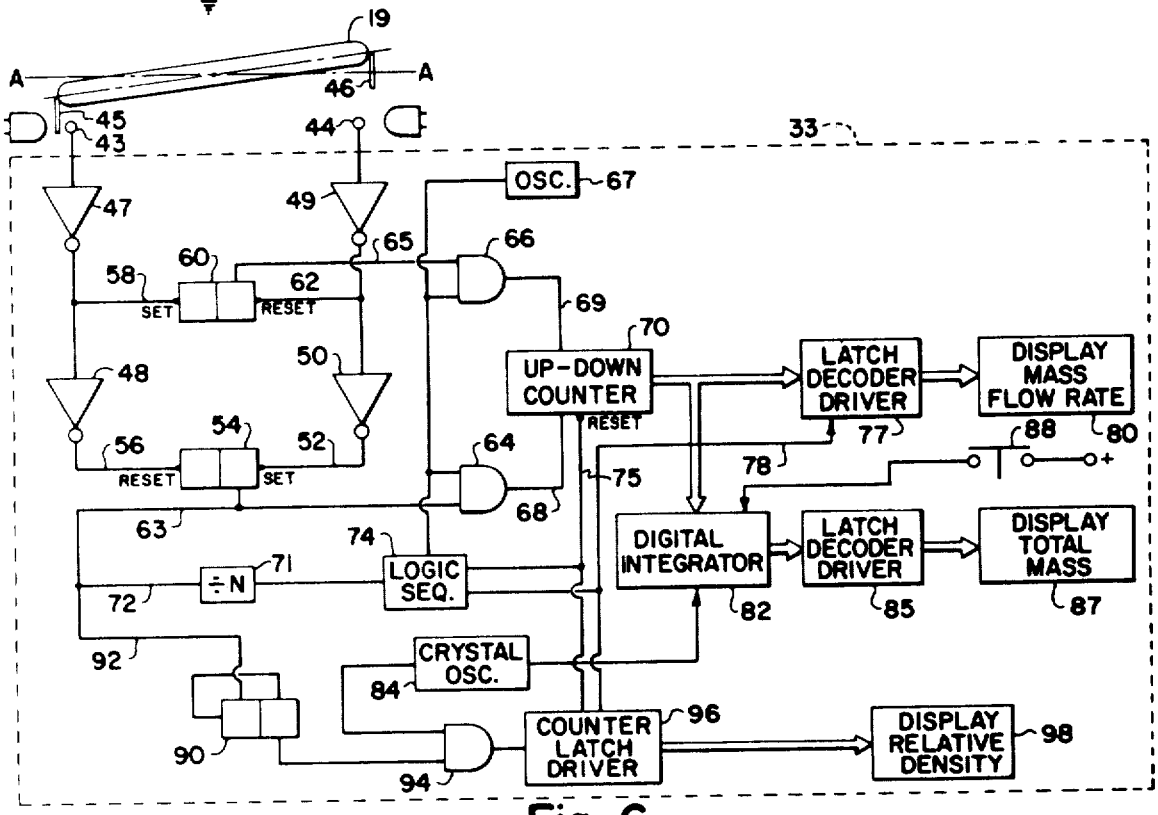
FIG. 6 is a logic diagram of the readout circuit of the flow meter of FIG. 1.
Figure 7:
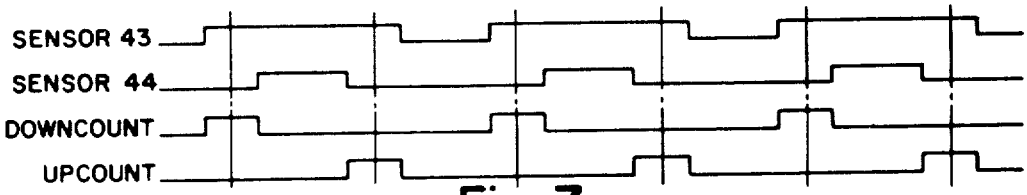
FIG. 7 is a timing diagram of the readout signals of the flow meter of FIG. 1 under no flow conditions.
Figure 8:
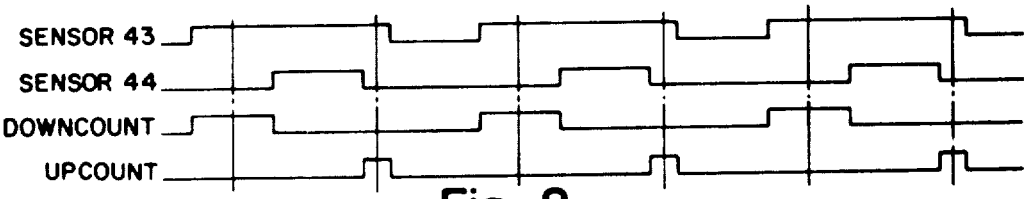
FIG. 8 is a timing diagram of the readout signal of the flow meter of FIG. 1 with flow through the conduit.

The nature and function of readout circuit 33 will be more readily understood with reference to the logic circuit illustrated in FIG. 6, and the related timing diagrams of FIGS. 7 and 8. Readout circuit 33 is connected to inlet side sensor 43 and outlet side sensor 44 which develop signals as flags 45 and 46 carried on base leg 19 pass by the respective sensor at approximately the midpoint of plane A—A the oscillation of "U" shaped conduit 14. As shown, inlet sensor 43 is connected through inverter amplifier 47 and inverter 48 while outlet side sensor 44 is similarly connected through inverter amplifier 49 and inverter 50. Line 52, the output from inverter 50, provides, as a result of the double inversion, a positive signal to the set side of flip-flop 54. Similarly, line 56 provides an output from inverter 48, again a positive signal, the reset side of flip-flop 54. Accordingly, flip-flop 54 will be set upon output of a positive signal from sensor 44, and reset on the subsequent output of a positive signal from sensor 43.

In a similar manner, line 58 provides the inverted signal from sensor 43 through inverter amplifier 47 to the set side of flip-flop 60, while line 62 provides the output of inverter amplifier 49 to the reset side of flip-flop 60. Thus, flip-flop 60 would be set upon the output of a negative signal from sensor 43, and reset upon the subsequent output of a negative signal from sensor 44. The output of flip-flop 54 is connected through line 63 to a logic gate such as AND gate 64. AND gates 64 and 66 are both connected to the output of oscillator 67 and, accordingly, upon output from flip-flop 54, the signal from oscillator 67 is gated through AND gate 64, to line 68 and thus to the downcount side of up-down counter 70. Similarly, upon the output of a signal from flip-flop 60, the output of oscillator 67 is gated through AND gate 66 to line 69 connected to the upcount side of updown counter 70.

Thus, in function, readout circuit 33 provides a downcount signal at the frequency of oscillator 67 to updown counter 70 for the period during which sensor 44 is activated prior to activation of sensor 43 during the down motion of "U" shaped conduit 14, while an upcount signal is provided to up-down counter 70 for the period during which sensor 43 is activated prior to activation of sensor 44 during the up motion of "U" shaped conduit 14.

The significance of readout circuit 33 will be more readily appreciated with reference to the timing diagram of FIG. 7 and FIG. 8. In FIG. 7, wave forms are illustrated for the condition in which "U" shaped conduit 14 is oscillated in a no-flow condition, but in which flags 44 and 46 are not precisely statically aligned with plane A—A. Thus, as shown in the timing diagram, sensor 44 initially switches positive early relative to the ideal time represented by the vertical lines on the upstroke, and switches negative late on the down stroke as a result of the misalignment of flag 46. On the other hand, sensor 43 switches positive late on the upstroke and switches negative early on the downstroke. However, when the outputs from flip-flops 54 and 60 are analysed and considering further that these flip-flops provide either downcount or upcount signals respectively to updown counter 70, it will be seen that flip-flop 54, operating on the positive or leading edge of the signals of sensors 43 and 44, provides an output on the up stroke, while, in view of the unchanged orientation *of* flags 45 and 46, flip-flop 60 provides a similar output on the downstroke. Accordingly, over a complete cycle, the up-down counter 70 is first downcounted a finite number of counts by the output of flip-flop 54, through gate 64, and then upcounted an equal amount by the output of flip-flop 60 through gate 66. Accordingly, the resulting count in up-down counter 70 is zero, representative of the no-flow condition.

On the other hand, under flow conditions as shown in FIG. 8, sensor 43 is activated earlier than in FIG. 7 as a result of the distortion of base leg 19 by the Coriolis force couple resulting from fluid flow, as discussed above. Similarly, sensor 44 is activated later for an identical reason. Thus, on the upstroke, flip-flop 54 is activated for a substantially longer period than in the condition of FIG. 7 since the misalignment of flags 45 and 46 is added to the distortion of base leg 19 of the Coriolis force couple in the up movement. On the other hand, upon down movement, i.e., generating the negative or trailing edge of the signals from sensors 43 and 44, the Coriolis force couple is reversed thus causing sensor 43 to be deactivated earlier and sensor 44 to be deactivated later. Accordingly, flip-flop 60 is activated for a diminished period of time. As is clear from the relative times of activation of the two flip-flops, the downcount period of updown counter 70 is substantially longer than the upcount period resulting from activation of flip-flop 60. The resulting increased count in the downcount side of up-down counter 70 is an accurate indication of the flow over a period of oscillation. The count in up-down counter 70 after a given number of oscillations is directly proportional to mass flow in "U" shaped conduit 14 during that time period. The number of oscillations may be determined by, for instance, counting the number of activations, as a typical example, flip-flop 54 at downcounter 71 connected to the output of flip-flop 54 by line 72. Thus, upon the occurrence of "N" outputs from flip-flop 54, downcounter 71 is activated and, in turn, activates logic sequencer 74. Logic sequencer 74 is connected to oscillator 67, and at the frequency of oscillator 67, first latches decoder driver 77 through line 78 and then resets updown counter 70 through line 75. Thus until logic sequencer 74 is again activated after "N" outputs from flip-flop 54, display 80 indicates the accumulated count of up-down counter 70 at the time of interrogation thereof, and accordingly displays mass flow rate for the period of "N" oscillations.

Total mass flow for a selected reset period is similarly provided in that the output from up-down counter 70 is supplied to digital integrator 82 which is also connected to crystal oscillator 84. Thus the counts from updown counter 70 are integrated with regard to time, i.e., the fixed, stable frequency of oscillator 84, and the integral provided to latch decoder driver 85 which in turn is connected to display 87 to provide a total mass flow readout for the period from last activation of reset 88, i.e., a switch connected to digital integrator 82.

As described above, the density factor may also be determined independent of mass flow measurements by activating flip-flop 90 at the clock frequency of the output of flipflop 54 through line 92. The output of flipflop 90 is provided to AND gate 94 which, upon activation of flipflop 90 provides the count of crystal oscillator 84 to counter latch driver 96. Thus, with the time information in terms of the counts from crystal oscillator 84, and with the period of oscillation datum from flip-flop 90[,] available, the count in counter latch driver 96 is a function of density of the fluid in "U" shaped conduit 14, and accordingly, the readout at display 98 provides the density factor discussed above. Since the density factor is not a linear function of the period of oscillation of "U" shaped conduit 14, the readout at display 98 must be further processed, either manually through a graph or through a microprocessor for density or specific gravities per se.

Summarily, it will be recognized that[, in] the most preferred embodiment of flow meter 10 of the present invention, provides, as desired, instantaneous mass flow rate, cumulative flow rate over any given period, density information as to the fluid, and volumetric flow rate if desired, i.e., by dividing mass flow rate by density. This is accomplished, according to empirical tests, at accuracies of 0.1 or 0.2 percent and will, for instance, measure gas flow at quite low rates in an accurate manner. There is no need to regulate the amplitude of the frequency of flow meter 10 in the preferred embodiment, i.e., when measuring the time period between output of one sensor until the output of the other sensor.

The following mathematical derivations are provided to supplement the above description of the flow meter and enhance understanding thereof.

Density Factor $$T = 2\pi\sqrt{\frac{M}{K_o}}$$

Where:
T = Time period of oscillation
M = Mass being oscillated
$K_0$ = Spring constant
In the case of the "U" shaped conduit, $M = M_p + M_f$
Where:
$M_p$ = Conduit Mass
$M_F$ = Fluid Mass [thus,]. *Thus,* the time period ($T_1$) of the conduit can be expressed $$T_1 = K_1\sqrt{K_2 + K_3 D_{fm}}$$

Where:
$K_1$ $K_2$ and $K_3$ are fixed constants and
$D_{fm}$ = mass density of the fluid
Therefore, by counting a fixed frequency oscillation, i.e., oscillator 84, density factor $d_f$ can be generated;

$$d_f = [T_1 f = F_o\sqrt{K_1K_2 + K_3 D_{fm}}]$$

$$T_1 f_o = K_1 f_o\sqrt{K_2 + K_3 D_{fm}}$$

Where:
$d_f$ = density factor
$f_o$ = oscillator frequency

MASS FLOW RATE

The Coriolis force on a particle on a revolving plane can be expressed by:

$$F_c = 2M_p W \times V_p$$

Where:
$F_c$ = force on particle due to Coriolis acceleration
$M_p$ = particle mass
$V_p$ = radial velocity of particle
W = Angular velocity of plane
In the case of the "U" shaped conduit, two forces, $F_{c1}$ and $F_{c2}$ are produced around axis O—O, which generate an oscillating moment $\Delta M$, expressed as:

$$\Delta M = F_{c1}r + F_{c2}r_2$$

Where:
$r_1$ and $r_2$ = distance from axis O—O to each leg Assuming symmetry, $\Delta M = 2F_{c1}r_1 = 4M_1V_1Wr_1$
Where:
$V_1$ = particle velocity
$M_1$ = particle mass
W = angular velocity $$M_1\left(\frac{\text{lbs Mass}}{\text{unit length}}\right)\cdot V_1\left(\frac{\text{unit length}}{\text{sec}}\right) = \Delta Q\,\frac{\text{lbs Mass}}{\text{sec}}$$

[Thus $\Delta M = 4Wr_1 3\Delta_q$]

[$M=\int \Delta M=4Wr_{1q}$]

*Thus* $\Delta M=4Wr_1\Delta Q$ $M=\int \Delta M=4Wr_1Q$

Where: $\Delta Q$ = incremental mass flow rate
Where: Q = Total mass flow rate in conduit The deflection of conduit around axis O—O can be expressed as:

$$\text{Torque}=K_s\Theta$$

Where:
$\Theta$ = deflection angle
$K_s$ = Angular spring constant
thus $Q=K_s\Theta/4Wr_1$, i.e., Q is directly proportional to $\Theta$ and $K_s$[are] , *and* inversely proportional to W.

Considering the time period $\Delta t$ between outputs of sensors 43 and 44:

$$V_p\Delta t=[2r\Theta]\ 2r_1\Theta$$

$$\text{or } \Delta t=\frac{[2r\theta}{V_p]}\ \frac{2r_1\theta}{V_p}$$

Where:
$V_p$ = conduit velocity
$\Delta t$ = time interval between outputs 43 and 44

$$V_p=LW$$

Where:
L = length of conduit $$\text{thus } \theta=\frac{[LW\Delta t}{2r]}\ \frac{LW\Delta t}{2r_1} \text{ and}$$

$$Q=\frac{[K_sLW\Delta t}{8Wr^2}=\frac{K_sL}{8r^2}\cdot\Delta t_{]}\ \frac{K_sLW\Delta t}{8Wr_1^2}=\frac{K_sL}{8r_1^2}\cdot\Delta t$$

Thus, mass flow is a function of pipe geometry constants and $\Delta t$. Accordingly, only $\Delta t$ need be determined in that the constants are, in effect, a scale factor.

Figure 9:
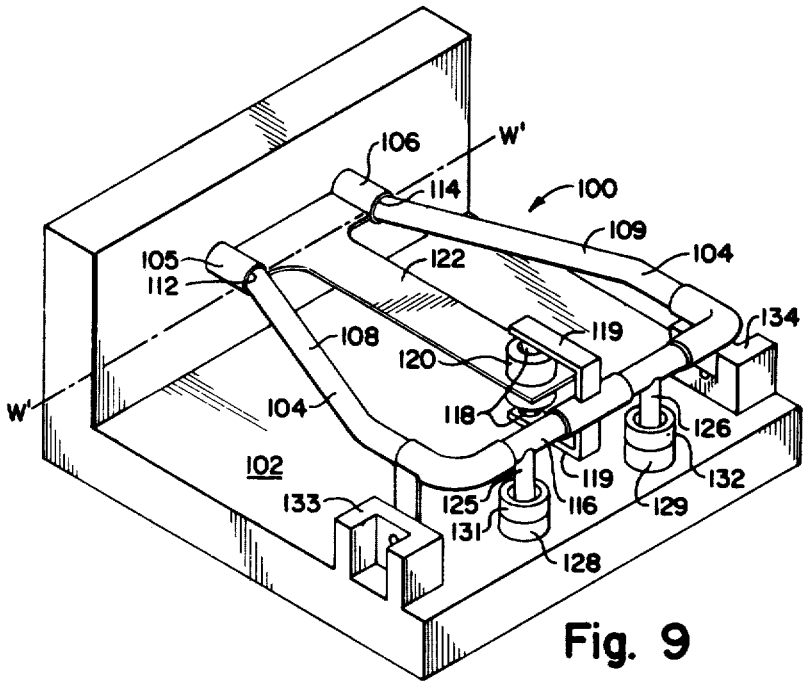
FIG. 9 is a simplified perspective view of a fluid flow meter according to another embodiment of the present invention.

Another embodiment of the invention is shown in FIG. 9, [whereat] *wherein* mass flow meter 100, which is similar [an] *in* many respects to flow meter device 10, is illustrated. As shown, flow meter 100 includes a base 102 and "U" shaped conduit 104 extending therefrom in a substantially solidly mounted, i.e., free of pivoting devices, manner. "U" shaped conduit 104 includes inlet 105 and outlet 106 which communicate with inlet leg 108 and outleg leg 109, respectively. Legs 108 and 109 are arranged to pivot at points 112 and 114 along axis W'—W' to permit oscillation of "U" shaped conduit 104 around axis W''—W''. This may be facilitated by, for instance, a thinning in the walls of "U" shaped conduit 104 at pivots 112 and 114, but such pivot points are continuous areas of "U" shaped conduit 104 and may be unaltered tubes. Base leg 116 connects inlet leg 108 and outlet leg 109 thus completing "U" shaped conduit 104.

Contrary to the preferred arrangement of flow meter 10, "U" shaped conduit 104 may advantageously have less resistance to bending around the Coriolis force distortion axis than around oscillation axis W'—W' since Coriolis force distortion is nulled. Magnets 118 carried on base leg 116 by supports 119 interact with drive coil 120 to oscillate "U" shaped conduit 104. Preferably, drive coil 120 is carried on cantilevered spring leaf 122 which is pivotally mounted adjacent axis W'—W' and of a natural frequency substantially equivalent to that of "U" shaped conduit 104 carrying the contemplated fluid therein. Of course, the mounting of magnet 118 and force coil 120 may be reversed, i.e., on conduit 104 and leaf spring 122, respectively. Also, leaf spring 122 may be dispensed with entirely when base 102 is of substantial mass compared to the mass of "U" shaped conduit 104 and the fluidized material flowed therethrough. However, in most instances, it is preferred to oscillate "U" shaped conduit 104 and leaf spring 122 at a common frequency but 180° out of phase to internally balance the forces within flow meter 100 and avoid vibration of base 102.

Figure 12:
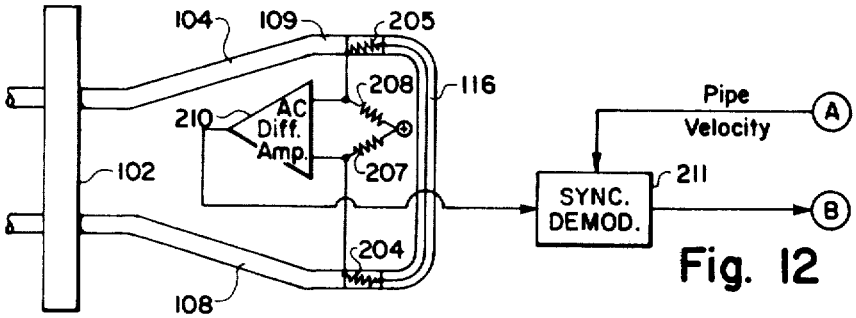
FIG. 12 is another circuit diagram for a purpose identical to that of FIG. 11.
Figure 13:
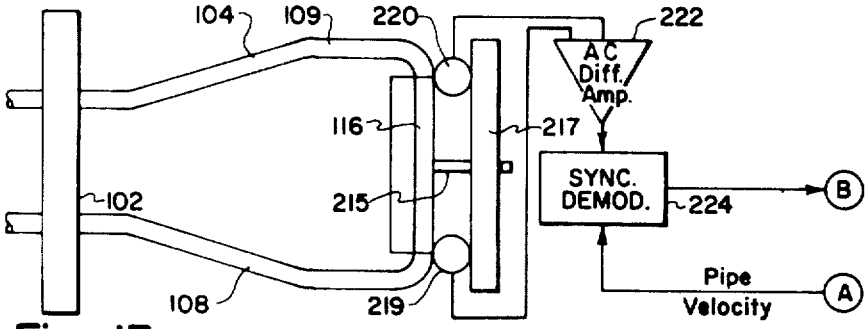
FIG. 13 is yet another circuit diagram for a purpose identical to that of FIG. 11.

Base leg 116 carries magnets 125 and 126 which depend downwardly therefrom. Magnet 125 is disposed within sense coil 128 mounted to base 102, while magnet 126 is similarly disposed within sense coil 129 also mounted on base 102. Magnet 125 extends within force coil 131 arranged symmetrically with sense coil 128, while magnet 126 extends within force coil 132 similarly mounted relative to sense coil 129. Deflection sensing means 133 and 134, which are shown in a simplified manner in FIG. 9, but in more detail in FIGS. 11 through 13, are positioned adjacent the intersection of inlet legs 108 and 109 and base leg 116.

Figure 10:
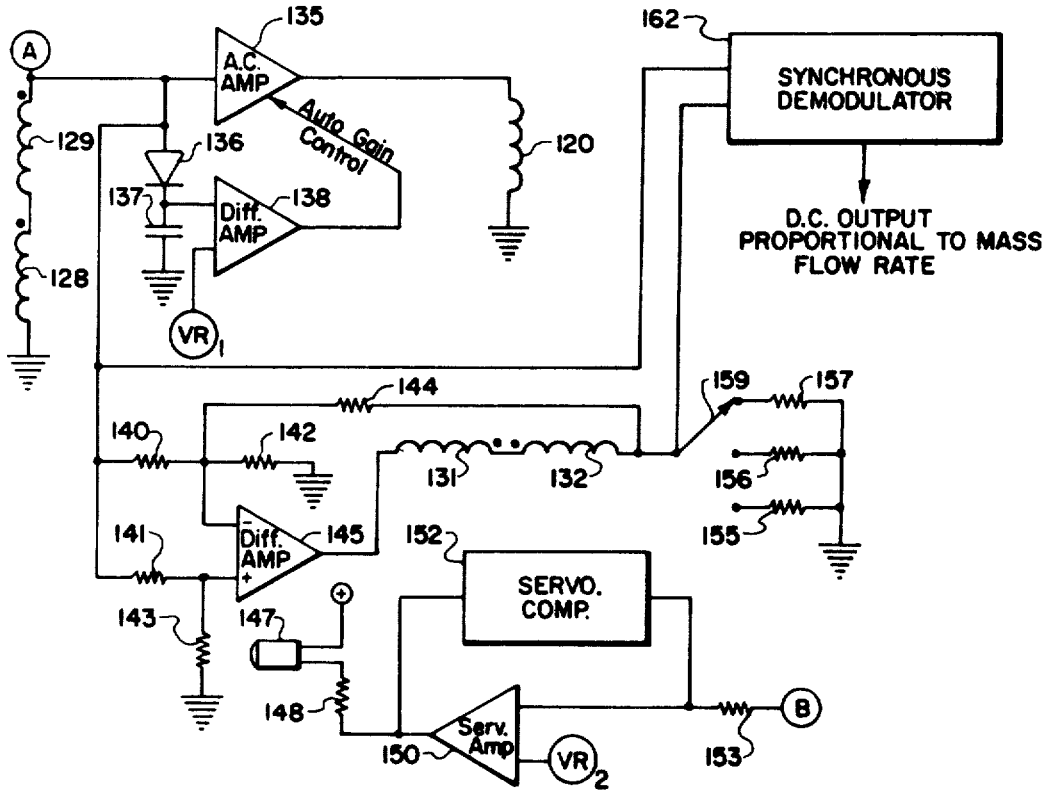
FIG. 10 is a circuit diagram of the drive and readout portion of the flow meter of FIG. 9, with the exception of the distortion sensing portion of the circuit.

Turning now to FIG. 10 which sets forth the circuit details not shown in FIG. 9, it should be noted that sense coils 128 and 129 are connected in series in such a manner that the movement of magnets 125 and 126 into sense coils 128 and 129 will generate a [sinuosoidal] *sinusoidal* signal "A" with an amplitude proportional to the velocity of "U" shaped conduit 104. This signal, the magnitude of which is proportional to the speed of movement of magnets 125 and 126, and accordingly a function of the amplitude of oscillation of "U" shaped conduit 104, is provided to AC amplifier 135, and to diode 136 which permits only the positive portion of the [sinusodial] *sinusoidsal* signal to charge capacitor 137. Accordingly, the input from diode 136 and capacitor 137 to differential amplifier 138 is determined by the magnitude of the sinusoidal signal. Differential amplifier 138 compares such input with reference voltage $VR_1$. Thus, if the voltage of capacitor 137 exceeds $VR_1$, amplifier 138 outputs a stronger signal. The output from AC amplifier 135, which is of course a [sinuosoidal] *sinusoidal* signal in phase with the oscillation of "U" shaped tube 104 and of a magnitude determined by the gain control [outputed] *outputted* by differential amplifier 138, drives coil 120 to maintain the desired oscillation of "U" shaped tube 104. Signal A is also supplied to a bridge formed of resistors 140, 141, 142 and photoresistor 143. Resistor 144 is included in a feedback loop between resistors 140 and 142, and the output from the interconnection of resistors 140, 142 and 144 is connected to, for instance, the minus input of differential amplifier 145. A variable light source, such as LED 147, is connected through resistor 148 to the output of servo amplifier 150. Servo compensator 152 is a conventional expedient in servo systems as described in Feedback Control Systems, Analysis And Synthesis, by [D+Azo] *D'Azo* and Hopuis, published by McGraw Hill, 1966, forms the feedback loop between one input of servo amplifier 150 and the output therefrom. Signal B, which is a DC signal [porportions] *proportional* to the small, unnulled distortion of "U" shaped conduit 104 generated as described below with regard to FIGS. 11, 12 and 13, is connected through resistor 153 to an input of servo amplifier 150. The output of servo amplifier 150 is referenced to voltage $VR_2$ and connected through resistor 148 to LED 147. Thus, as a function of the magnitude of signal B with respect to $VR_2$ driving servo amplifier 150, the intensity of LED 147 is regulated. For instance, the resistivity of photoresistor 143 decreases upon an increase in intensity of LED 147, thereby decreasing the signal supplied to the positive input of differential amplifier 145 relative to that through resistors 140 and 142 to the negative input thereof. Thus, the output of differential amplifier 145 is 180° out of phase with signal A, since the positive input thereto is decreased while the negative input is not. In summary, as signal B increases, LED 147 is dimmed and the resistance of photoresistor 143 increases. This causes the Signal A phase output of differential amplifier 145 to increase. The output of differential amplifier 145 is connected to force coils 131 and 132 which, as described above, are supported on base 102 and connected in series and out of phase. Thus, current through force coils 131 and 132 creates, with reference to FIG. 9, a torque by attracting, for instance, magnet 125 and repelling magnet 126, both of which are connected to base leg 116. This torque across base leg 116 nulls distortion of base leg 116 as a result of Coriolis forces generated by flow through "U" shaped conduit 104.

Resistors 155, 156 or 157 are connectable, by means of switch 159 and, to force coils 131 and 132 thereby providing a selectable load to adjust the scale factor and provide for greater or lesser torque on base leg 116. The output from series connected force coils 131 and 132 are also connected as one input to synchronous demodulator 162, which will be described in more detail with reference to FIG. 14. The output of synchronous demodulator 162 is a DC signal proportional to mass flow rate, and accordingly provides a measurement of mass flow rate. A DC volt meter (not shown) may be connected to the output of synchronous demodulator 162 to provide a visual reading of mass flow rate through "U" shaped conduit 104, or the DC signal may be directly employed in, for instance, a control loop to other equipment.

Figure 11:
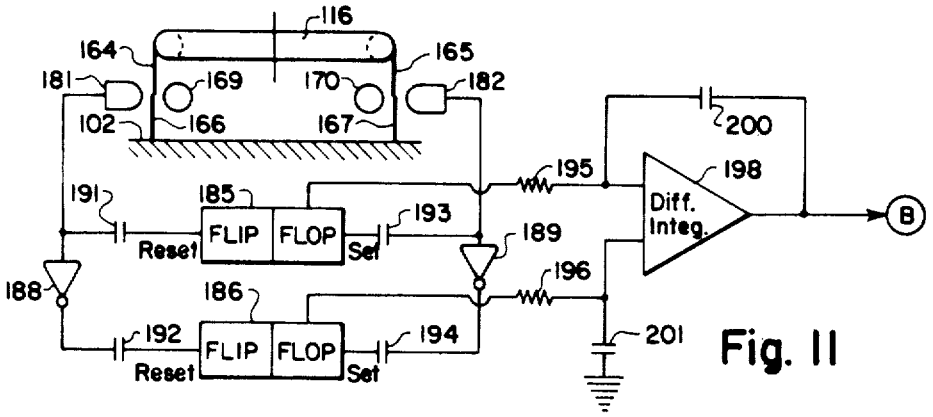
FIG. 11 is a circuit diagram of one distortion sensing arrangement suitable to generate the signal labeled B in FIG. 10.

As shown in FIG. 11, deflection sensors 133 and 134 may comprise, for instance, left flag 164 and right flag 165 which depend from conduit 104. Fixed left flag 166 and fixed right flag 167 are mounted on base 102. Accordingly, as base leg 116 oscillates, flags 164 and 165 will preclude light from light sources 169 and 170 from reaching photosensors 181 and 182, respectively. Preferably, the point at which flags 164 and 166, and 165 and 167 intersect to block light is about at the midpoint of oscillation of base leg 116, but one set of flags may be offset somewhat from the other with regard to the interference point. It will be recognized that in the event of distortion of base leg 116 angularly relative to base 102 as a result of Coriolis forces generated by flow through "U" shaped conduit 104, a change in time lapse will exist between the occulting by flags 164 and 166 and flags 165 and 167. [The time difference, and sense, will be dependent upon, at] *At* a fixed oscillating rate of base leg 116, *the time difference and sense thereof will be dependent upon* the Coriolis forces generated and the direction of oscillation. Photosensor 181 is connected to flip-flop 185 at the reset side and 186 at the reset side, with the connection to flipflop 186 being through inverter 188. Differentiating capacitors 191 and 192 are included in reset input. Similarly, photosensor 182 is connected to the set side of flip-flop 185 and, through inverter 189 to the set side of flip-flop 186 with differentiating capacitors 193 and 194 similarly included in the inputs. Thus, as flags 164 and 166 close, a positive signal is generated by photosensor 181 which activates the reset side of flip-flop 185 and as flags 165 and 167 close, a positive signal is similarly generated by photosensor 182 to activate the set side of flip-flop 185. Accordingly, flipflop 185 is activated for the period between the closing of such sets of flags. On the other hand, the opening of flags 164 and 166, and 165 and 167, during the upstroke of base leg 116, generates a falling edge, or negative signal, from photosensors 181 and 182, respectively, which similarly activates flip-flop 186 through inverters 188 and 189. Accordingly, flip-flop 186 is activated for the period between the opening of one set of such flags and the other set. The outputs from flip-flop 185 and 186 are provided, through resistors 195 and 196, respectively, to the inputs of differential integrator 198. Integrating capacitor 200 is provided in association with resistor 195, while integrating capacitor 201 is provided in association with resistor 196 at such inputs to provide integrating capacity.

Output signal B from differential integrator 198 thus depends on the periods of activation of flip-flops 185 and 186. In the event that base leg 116 is merely oscillating without distortion, the time differences between the opening and closing of the flags will be substantially constant and the inputs to differential integrator 198 essentially identical, thereby providing no signal B. On the other hand, in the event Coriolis forces are generated, base leg 116 will be distorted in a clockwise direction on one stroke of the oscillation, and in a counter clockwise direction on the other stroke. Thus, the closing on one side of the flags will be early on one stroke and late on the other, while the other set of flags will be late on the first stroke and early on the other. The activation of flipflops 185 and 186 therefore will not be for equal lengths of time, and differential integrator 198 will output an appropriate DC signal B of a desired plus or minus sense depending upon the phase of the distortion of base leg 116 relative to the up/down stroke.

Another arrangement to provide the same result is shown in FIG. 12. As shown, strain gages 204 and 205 are mounted adjacent the intersection of inlet leg 108 and base leg 116, and outlet leg 109 and base leg 116, respectively. Strain gages 204 and 205, which may be viewed as variable resistors dependent upon the distortion of the adjacent portion of "U" shaped conduits 104, are connected with resistors 207 and 208 to form a bridge circuit communicating with a voltage source as indicated, and connected to AC differential amplifier 210. In the case of simple oscillation of "U" shaped conduit 104, the resistivity of strain gages 204 and 205 vary equally thereby providing essentially identical inputs to AC differential amplifier 210. However, in the event of distortion due to Coriolis forces, one of strain gages 204 and 205 will increase in resistivity while the other decreases thereby providing different inputs to AC differential amplifier 210 and providing an output in the form of an AC signal proportional in magnitude and sense to the different strains imposed upon strain gages 204 and 205.

The output from AC differential amplifier 210 is provided to synchronous demodulator 211, which, in conjunction with signal A, provides a DC output proportional in magnitude and sense to the distortion of "U"

shaped conduit 104 as a result of Coriolis forces. Synchronous demodulator 211 is similar to above-described synchronous demodulator 162, which will be described in more detail with reference to FIG. 14.

A somewhat similar arrangement for generating signal B is illustrated in FIG. 13. In this instance, however, pivot member 215 is mounted centrally on base leg 116 and carries inertia bar 217 which is free to rotate around pivot member 215 and balanced thereon. Crystals 219 and 220 are connected between inertia bar 217 and base leg 116. Thus, if base leg 116 undergoes simple oscillation, inertia bar 217 merely follows the oscillation without a tendency to rotate around pivot member 215. However, in the event of distortion of "U" shaped conduit 104 as a result of Coriolis forces, base leg 116 tends to rotate relative to inertia bar 217, thereby imposing forces in opposite directions upon [crystal] *crystals* 219 and 220 and thus generating, as a result of piezoelectric effect, signals from crystals 219 and 220. The outputs from crystals 219 and 220 are connected to AC differential amplifier 222, which in turn is connected to synchronous demodulator 224 to provide, in conjunction with signal A, a DC signal B of a magnitude and sense proportional to the distortion of "U" shaped conduit 104. It is to be understood, of course, that a voltage source and strain gages could be conveniently employed in place of crystals 219 and 220.

Figure 14:
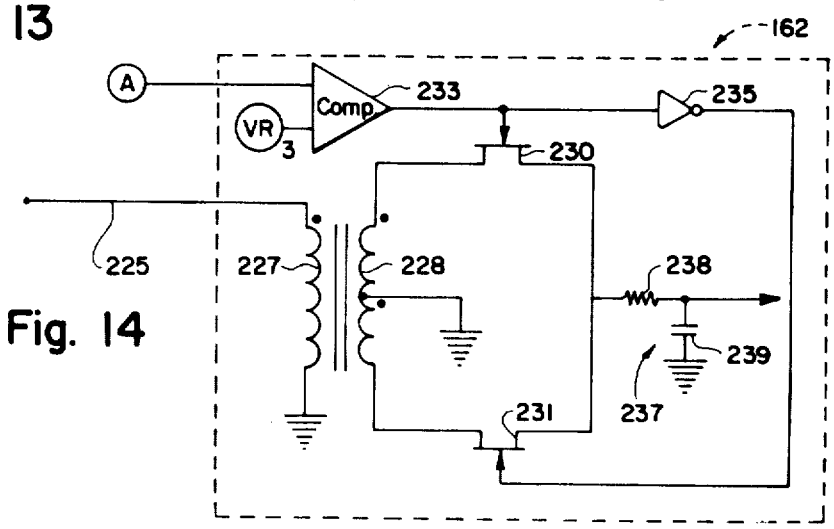
FIG. 14 is a typical circuit diagram of the synchronous demodulator of FIGS. 10, 12 and 13.

Synchronous demodulator 162, described above with reference to FIG. 10, and accordingly, similar to synchronous demodulators 211 and 224, is described in more detail at FIG. 14. As shown, input signal in the form of an AC signal is provided at input line 225 to the primary winding 227 of a transformer. Secondary windings 228, having a common ground, are, as indicated by the polarity, wound in opposite directions. Thus, the output from the opposed ends of secondary windings 228 will be out of phase by 180°. Switching means, in the form of FET transistors 230 and 231 are provided in the outputs from secondary windings 228. Comparator 233, which is connected to signal A, outputs positive or negative signals depending upon the relationship of signal A to reference voltage $VR_3$. The output of comparator 233 thus is a square wave signal of positive or negative sense, and is provided to inverter 235 which inverts the signal. Thus, one portion of the square wave signal turns on switching means 230 while switching means 231 is turned off, and the other portion turns on switching means 231 while switching means 230 is off. Accordingly, the portion of input signal 225 which is in phase with signal A is provided to RC circuit 237 formed of resistor 238 and capacitor 239 which outputs a DC signal which is proportional to the root mean square of the input to filter 237. This DC output constitutes the readout as described above, i.e., a DC signal proportional to the mass flow through "U" shaped conduit 104.

In summary, flow meter 100 described above, utilizes deflection sensors 133 and 134 to detect the magnitude and sense of small, incipient deflections of "U" shaped conduit 104 due to Coriolis force and generate a DC signal of a sense and magnitude proportional to such deflection. The DC signal, signal B, is in essence a feedback signal which regulates the nulling force generated by force coils 131 and 132 to produce a counterforce thus preventing appreciable distortion beyond the incipient sensed distortion. Sense coils 128 and 129, in addition to maintaining the frequency of oscillation of "U" shaped conduit 104 through the drive circuit described above, also provides signal A, a signal in phase with the Coriolis forces thus providing for proper modulation of force coils 131 and 132, proper synchronization of the output of AC amplifier 135 to drive "U" shaped conduit 104 and proper demodulation of the synchronous signal of force coils 131 and 132 to produce a DC output proportional to mass flow rate.

Though the two generally preferred means for measuring the Coriolis forces are described in detail above, i.e., allowing resilient deflection of the conduit and measuring the deflection, or nulling the force to preclude deflection and measuring the nulling force, numerous other generally less desirable means exist. In any event, by using a solidly mounted "U" shaped conduit essentially free of pressure sensitive joints or pivot means, oscillation and deflection may be readily accomplished and mass flow determined over wide pressure ranges.

Although only limited preferred embodiments of the invention have been illustrated and described, it is anticipated that various changes and modifications will be apparent to those skilled in the art, and that such changes may be made without departing from the scope of the invention as defined by the following claims.

What is claimed is:

1. A flow meter for flowable materials comprising:

(*1*) a support;

(*2*) a "U" shaped, continuous conduit *which*

(*i*) *is free of pressure sensitive joints,*

(*ii*) *is* solidly mounted at the open [end] *ends* of the "U" to the support, (*iii*) [and extending therefrom in a nonarticulated,] *extends from the support in a* cantilevered fashion[;], (*iv*) *has an oscillation axis, passing through the side legs thereof substantially at the points of solid mounting and parallel to the support, about which the conduit may be rotated relative to the support and a deflection axis positioned in the plane of the conduit substantially equidistant between and parallel to the side legs of said conduit and extending perpendicularly through the oscillation axis,*

(*v*) *exhibits a different resonant frequency about each of the respective axes;*

(*3*) means for oscillating the conduit relative to the support on either side of the static plane of the "U" shaped conduit and about [a first] *said* oscillation axis; and (*4*) means to measure the *magnitude of* Coriolis forces tending to elastically distort the "U" shaped conduit [around a second] *about the* deflection axis [positioned substantially equidistant between the side legs of the "U" shaped conduit and through the oscillation axis thereof];

whereby the rate of mass flow of the flowable material [may be] *is* determined [by] *from* the magnitude of [the] *said Coriolis* forces [tending to deflect the "U" shaped conduit around the second deflection axis].

2. A flow meter as set forth in claim [1] *5* in which the "*U*" *shaped conduit is oscillated about its oscillation axis at constant frequency and the* means to measure *the magnitude of* Coriolis forces comprise means to measure the angular deflection of the "U" shaped conduit as a result of elastic deformation of the "U" shaped conduit [around a second] *about the* deflection axis [positioned substantially equidistant between the conduit side legs];

whereby the rate of mass flow of the flowable material [may be] *is* determined by the degree of deflection of the "U" shaped conduit [around the second axis] *about the deflection axis.*

3. A flow meter as set forth in claim [2] *1* in which the resonant frequency of the "U" shaped conduit [around] *about* the [first] oscillation axis is lower than the resonant frequency of the "U" shaped conduit [around] *about* the [second] deflection axis.

4. A flow meter as set forth in claim [2] *1* in which the means for oscillating the conduit comprise a magnet mounted on the "U" shaped conduit, a sensor coil mounted adjacent the magnet, a force coil mounted adjacent the magnet, and means to supply an electrical current to the force coil in response to a signal from the sensor coil.

5. A flow meter as set forth in claim 4 in which the oscillation means further comprise means to identify the peak amplitude of the signal generated by the sensor coil as a result of relative movement between the sensor coil and the magnet and to output current to the force coil such that a preselected amplitude of oscillation is maintained.

6. A flow meter as set forth in claim [2 in which the "U" shaped conduit has attached thereto at the oscillation axis a] *1 wherein the oscillation means includes a suitably mounted* spring arm having a natural resonant frequency substantially *equal to* that of the "U" shaped conduit.

7. A flow meter as set forth in claim 6 in which a sensor coil and force coil are carried on the spring arm or the conduit, and a magnet positioned adjacent both the sensor coil and force coil is carried on the other, [with] *whereby* the magnet, sensor coil and force coil in conjunction with amplifying and peak detector means [comprising] *comprise* the means for oscillating the conduit [around the first] *and spring arm out of phase with each other about the* oscillation axis.

8. A flow meter as set forth in claim [2] *1* in which *the means to measure the mass flow rate comprise* first and second sensors [are] mounted adjacent the "U" shaped conduit at symmetrical positions relative to the [second] deflection axis and substantially at the [midpoint] *midpoint* of oscillation of the conduit, each sensor being adapted to output a signal as the adjacent portion of the "U" shaped conduit passes through the mid-plane of oscillation, and further including means for measuring the time lag between signal outputs by the sensors ]may be thereby establishing the degree of deflection of the "U" shaped conduit] *whereby the rate of mass flow is determined as a directly proportional function of said time lag.*

9. A flow meter as set forth in claim 8 in which time lag measurement means [subtracts] *subtract* the time [lags] *lag* in one direction of *conduit* oscillation from that [of] *in* the other direction of *conduit* oscillation.

10. A flow meter as set forth in claim 8 in which the [output] *outputs* from the first and second sensors are each electrically connected to a pair of inverters in series, the outputs of the first inverters in each series [being] *are* connected one each to the set and reset inputs of a first [flip-flip] *flip-flop* and the outputs of the second inverters in each series [being] *are* connected one each to the set and reset inputs of a second flip-flop, [first and second logic gates,] the output from the first flip-flop [being] *is* connected to [an] *one* input of [the] *a* first logic gate and the output of the second flip-flop [being] *is* connected to [an] *one* input of [the] *a* second logic gate, [an oscillator connected to inputs of both the first and second logic gates,] *the other inputs of both the first and second logic gates are connected to an oscillator,* the output of the first logic gate [being] *is* connected to one clock input of an up-down counter, and the output of the second logic gate [being] *is* connected to the other input of the up-down counter, whereby the up-down counter is activated as a function of the time differential of activation of the first and second sensors with [upcount] *up-count* being provided in one direction of [the] *conduit* oscillation and [downcount] *the down-count* being provided in the opposite direction of *conduit* oscillation[, thereby providing a determination of the deflection of the "U" shaped conduit as a function of the absolute count therein].

11. A flow meter as set forth in claim 10 further including means for transferring and displaying the output from the up-down counter to a display register upon the occurrence of "N" oscillations of the "U" shaped conduit as a readout of the mass flow *rate* therethrough and also including means for resetting the up-down counter after transfer [to] *of* the up-down counter output to the display register.

12. A flow meter as set forth in claim 10 [further including a fixed frequency oscillator and in which] *wherein* the output of the [updown] *up-down* counter is connected to a digital integrator, the digital integrator [also being connected to the output of the fixed frequency oscillator, the integrated output of the integrator being] *derives a time base from a fixed frequency oscillator, and the output of the digital integrator is* connected to a display readout of total mass flow[, and further including means for resetting, latching and displaying the output from the digital integrator upon the occurrence of the "N" oscillations of the conduit].

13. A flow meter as set forth in claim [2] *8* including means for measuring the time period of oscillation of the "U" shaped conduit and displaying the time period as a related function of the density of a fluid flowing through the "U" shaped conduit.

14. A flow meter as set forth in claim 1 in which the means *for oscillating the conduit cause oscillation at constant frequency and amplitude and the means* to measure *the magnitude of* Coriolis forces comprise:

means to sense distortion of the "U" shaped conduit [around] *about* the [second] deflection axis [positioned substantially equidistant between the side legs of the "U" shaped conduit];

means responsive to the distortion sensing means to generate a counter force to limit the distortion to [but a small,] *an* incipient distortion; and means to measure the counter force;

whereby the rate of mass flow of the flowable material [may be] *is* determined by the magnitude of the counterforce.

15. A flow meter as set forth in claim 14 in which the means to sense distortion of the "U" shaped conduit [around a second] *about the* deflection axis comprise centerline crossing sensors positioned one each adjacent the side legs of the "U" shaped conduit at substantially the midpoint of the oscillation [around the first] *about the* oscillation axis.

16. A flow meter as set forth in [claims] *claim* 15 in which the centerline crossing sensors each comprise a pair of flags, one fixedly mounted and the other attached to [the] *a* side leg of the "U" shaped conduit and adapted to overlap the fixed flag at about the midpoint of the oscillation, a light source mounted on one side of the flags, and a photosensitive detector mounted on the other side of the flags whereby the centerline crossing may be detected by blocking the light source from the photosensitive detector by the flags.

17. A flow meter as set forth in claim 14 in which the means to detect distortion of the "U" shaped conduit *about the deflection axis* comprise a pair of strain gages attached one each to the "U" shaped conduit adjacent each intersection of the side legs and base leg of the "U" shaped conduit, the strain gages forming a bridge circuit means having a signal output proportional to the distortion of the "U" shaped conduit [around the second] *about the* deflection axis.

18. A flow meter as set forth in claim 14 in which the means to sense distortion of the "U" shaped conduit *about the deflection axis* comprise an [enertia] *inertia* bar [symetrically] *symmetrically* and pivotally mounted at about the [mid-point] *midpoint* of the base leg of the "U" shaped conduit, and a pair of force sensing means connected one each between each end of the inertia bar and the adjacent portions of the base leg of the "U" shaped conduit.

19. A flow meter as set forth in claim 18 in which the force sensing means comprise crystals adapted to output an electrical signal when a force is imposed thereon.

20. A flow meter as set forth in claim [18] *19* in which the crystals are included in a bridge circuit adapted to output a signal of magnitude and sense proportional to the strain imposed on the crystals by the inertia bar and adjacent "U" shaped conduit.

21. A flow meter as set forth in claim 14 in which the means responsive to the distortion sensing means comprise a pair of force coils and a pair of associated magnets, one pair being mounted fixedly and the other pair being mounted to the "U" shaped conduit, and means to provide a signal to the force coils to induce a torque [around the second] *about the* deflection axis of the "U" shaped conduit as one force coil attracts an associated magnet and the other force coil repels the associated magnet.

22. A flow meter as set forth in claim 21 in which the force coils are connected in series but with opposite polarity and the signal thereto is generated by a differential amplifier responsive to the magnitude of the distortion sensed by the distortion sensing means.

23. A flow meter as set forth in claim 21 in which a synchronous demodulator is included with one input thereto being the signal provided *to* the force coils and a second [signal] *input thereto* being a signal [varying with] *generated by* the oscillation of the "U" shaped conduit, and the output [being the portion of the two input signals in phase with one another] *is a direct current signal proportional to mass flow rate.*

24. A flow meter for flowable materials comprising:

(*1*) a support;

(*2*) [a continuous joint-free conduit fixedly attached to the support at the inlet and outlet ends of the conduit and extending directly from the support in a cantilevered, nonarticulated manner around an axis of symmetry substantially midway between the inlet and outlet of the conduit and in the plane of the conduit;] *a continuous conduit which*

(*i*) *is free of pressure sensitive joints,*

(*i*) *is fixedly attached to the support at the inlet and outlet ends of the conduit,*

(*iii*) *extends from the support in a cantilevered fashion,*

(*iv*) *is mounted about an axis of symmetry located substantially midway between the inlet and outlet ends of the conduit and transverse to an oscillation axis, said oscillation axis passing through the side legs of the conduit substantially at the points of solid mounting and parallel to the support, and both axes being in the plane of the conduit, and*

(*v*) *exhibits a different resonant frequency about each of the respective axes;*

(*3*) means for oscillating the conduit [around an] *about the* oscillation axis [transverse to the axis of symmetry]; and (*4*) means for measuring the angular displacement of the conduit as a result of elastic deformation of the conduit around the axis of symmetry thereof upon oscillation of the conduit with fluid flow therethrough;

whereby *the rate of* mass flow through the conduit [may be] *is* determined as a function of the angular displacement of the conduit [around] *about* the axis of symmetry.

25. A flow meter as set forth in claim 24 in which *said continuous conduit is oscillated about the oscillation axis at constant frequency and amplitude and* the means to measure angular deflection of the conduit comprise first and second sensors positioned adjacent opposite sides of the conduit at a plane positioned at the [mid-point] *midpoint* of oscillation thereof, and further includes means for measuring the time differential of passage of the corresponding portions of the conduit past the first sensor and the second sensor.

26. A flow meter as set forth in claim 24 in which a spring arm having a resonant frequency substantially the same as the resonant frequency of the conduit [around] *about* the oscillation axis thereof is attached to the conduit between the inlet and outlet ends thereof adjacent the support.

27. A flow meter as set forth in claim 24 in which the resonant frequency of the conduit [around] *about* the oscillation axis is lower than the resonant frequency of the conduit [around] *about* the axis of symmetry [thereof].

28. A flow meter for flowable materials comprising[;]*:*

(*1*) a support;

[a continuous joint-free conduit fixedly attached to the support at the inlet and outlet ends of the conduit and extending directly from the support in a cantilevered, nonarticulated manner around an axis of symmetry substantially midway between the inlet and outlet of the conduit and in the plane of the conduit;]

(*2*) *a continous conduit which*

(*i*) *is free of pressure sensitive joints,*

(*ii*) *is fixedly attached to the support at the inlet and outlet ends of the conduit,*

(*iii*) *extends from the support in a cantilevered fashion,*

(*iv*) *is mounted about an axis of symmetry located substantially midway between the inlet and outlet ends of the conduit and transverse to an oscillation axis, said oscillation axis passing through the side legs of the conduit substantially at the points of solid mounting and parallel to the support, and both axes being in the plane of the conduit, and*

(*v*) *exhibits a different resonant frequency about each of the respective axes;*

(3) means for oscillating the conduit [around an] *about the* oscillation axis [transverse to the axis of symmetry, the oscillation being at a predetermined frequency;] *at a constant frequency and amplitude;*

(4) means to sense incipient angular displacement of the conduit [around] *about* the axis of symmetry [thereof] upon oscillation of the conduit with fluid flow therethrough;

(5) means responsive to the incipient angular displacement sensing means to generate a nulling force to limit elastic deformation of the conduit [around] *about* the axis of symmetry to small increments; and (6) means to measure the nulling force;

whereby mass flow [to] *rate through* the conduit [may be] *is* determined as a function of the magnitude of the nulling force.

29. A flow meter as set forth in claim 28 in which *the conduit is "U" shaped and* the deflection measuring means comprise centerline crossing detectors positioned one each adjacent the intersections of the side legs and base leg of the ["U" shaped] conduit.

30. A flow meter as set forth in claim 28 in which a spring arm having a resonant frequency substantially the same as the resonant frequency of the conduit [around] *about* the oscillation axis thereof is attached to the conduit between the inlet and outlet ends [at the oscillation axis] and the means for oscillating the conduit [around] *and spring arm about* the oscillation axis transverse to the axis of symmetry are carried on the spring arm and the adjacent portion of the "U" shaped conduit.

31. A flow meter as set forth in claim 28 in which the resonant frequency of the conduit [around] *about* the oscillation axis is higher than the resonant frequency of the conduit [around] *about* the axis of symmetry thereof.

32. A flow meter for flowable materials comprising:

a support;

a "U" shaped conduit mounted at the open [end] *ends* of the "U" to the support and extending therefrom in a cantilevered fashion;

means for oscillating the conduit relative to the support on either side of the static plane of the "U" shaped conduit and about a first oscillation axis;

first and second sensors mounted adjacent the "U" shaped conduit at symmetrical positions relative to a second deflection axis positioned substantially equidistant between the side legs of, *and in the same plane as,* the "U" shaped conduit and through the oscillation axis thereof, the sensors being positioned substantially at the midpoint of oscillation of the "U" shaped conduit and each sensor being adapted to output a signal as the adjacent portion of the "U" shaped conduit passes the sensor; and means for measuring the time lag between the signal outputs by the sensors thereby establishing the [degree of deflection of the "U" shaped conduit.] *mass flow rate through the "U" shaped conduit.*

33. A flow meter as set forth in claim 32 in which time lag measurement means subtract[s] the time lag[s] in one direction of *conduit* oscillation from that [of] *in* the other direction of *conduit* oscillation.

34. A flow meter as set forth in claim 32 in which the output from the first and second sensors are each electrically connected to a pair of [invertors] *inverters* in series, the outputs of the first [invertors] *inverters* in each series [being] *are* connected one each to the set and reset inputs of a first flip-flop and the outputs of the second inverters in each series [being] *are* connected one each [ot] *to* the set and reset inputs of a second flip-flop, [first and second logic gates,] the output from the first flip-flop [being] *is* connected to [an] *one* input of [the] *a* first logic gate and the output of the second flip-flop [being] *is* connected to [inputs of both the first and second logic gates,] *one input of a second logic gate, the other inputs of both the first and second logic gates are connected to an oscillator,* the output of the first logic gate [being] *is* connected to one clock input of an up-down counter, and the output of the second logic gate [being] *is* connected to the other input of the up-down counter, whereby the up-down counter is activated as a function of the time differential of activation of the first and second sensors with [upcount] *up-count* being provided in one direction of [the] *conduit* oscillation and the [downcount] *downcount* being provided in the opposite direction of *conduit* oscillation[, thereby providing a determination of the deflection of the "U" shaped conduit as a function of the absolute count therein].

35. A flow meter as set forth in claim 34 further including means for transferring and displaying the output from the up-down counter to *a* display register upon the occurrence of "N" oscillations of the "U" shaped conduit as a readout of the mass flow *rate* therethrough and also including means for resetting the [updown] *up-down* counter after transfer of the [updown] *up-down* counter output [from] *to* the display register.

36. A flow meter as set forth in claim 34 [further including a fixed frequency oscillator and in which] *wherein* the output of the [updown] *up-down* counter is connected to a digital integrator, the digital integrator [also being connected to the output of the fixed frequency oscillator, the integrated output of the integrator being] *derives a time base from a fixed frequency oscillator, and the output of the digital integrator is* connected to a display for readout of total mass flow[, and further including means for resetting, latching and displaying the output from the digital integrator upon the occurence of "N" oscillations of the conduit].

37. A flow meter as set forth in claim 32 in which *the* means for *oscillating the conduit cause oscillation at constant frequency and amplitude and means are present for* generating a counterforce in response to the [force generating the] *Coriolis force-generated* deflection of the "U" shaped conduit [are indicated] to limit [the] *such* deflection to [a small, unapparent] *an incipient* deflection, and the *mass* flow *rate* is measured by determining the *magnitude of the* counterforce.

38. A flow meter for flowable materials comprising:

a support;

a continuous conduit attached to the support at the inlet and outlet ends of the conduit and extending from the support in a cantilevered manner around an axis of symmetry substantially midway between the inlet and outlet of the conduit and in the plane of the conduit;

means for oscillating the conduit around an oscillation axis substantially transverse to the axis of symmetry; first and second sensors positioned adjacent opposite sides of the conduit at a point positioned at the midpoint of oscillation thereof; and further means for measuring the time differential of passage of the [corresponding] *symmetrically opposite* portions of the conduit past the first sensor and the second sensor.

39. A flow meter as set forth in claim 38 in which time differential measurement means subtract [s] the time differential [s] in one direction of *conduit* oscillation from the time differential [s] in the other direction of *conduit* oscillation.

40. A flow meter as set forth in claim 39 in which *the means for oscillating the conduit cause oscillation at constant frequency and amplitude and* means *are present* to produce a nulling force to limit the time differential of passage *of the opposite sides of the conduit through the midpoint of oscillation* to that [having a minimum deviation from the time differential of passage of an undistorted "U" shaped conduit, are included] *of a conduit free from deflection about the axis of symmetry caused by Coriolis forces,* and the *mass* flow *rate* is measured by determining *the magnitude of* the nulling force.

41. A method of measuring flow of a material comprising:

(*1*) flowing the material through a continuous [, joint-free] curved conduit *free of pressure-sensitive joints,* with the inlet and outlet portions thereof solidly connected in a cantilevered [,] beamlike fashion to a support [;], *which conduit*

(*i*) *is mounted about an axis of symmetry located substantially midway between the inlet and outlet ends of the conduit and transverse to an oscillation axis, said oscillation axis passing through the side legs of the conduit substantially at the points of solid mounting and parallel to the support, and both axes being in the plane of the conduit, and*

(*ii*) *exhibits a different resonant frequency about each of the respective axes;*

(*2*) oscillating the conduit [substantially around an axis transverse to the inlet and outlet portions thereof;] *about the oscillation axis; (3)* generating Coriolis forces in the curved conduit as a result of material flow through the oscillating conduit; and (*4*) measuring the *magnitude of the* Coriolis forces tending to deform the conduit [around an] *about the* axis of symmetry substantially perpendicular to the oscillation axis of the conduit;

whereby the magnitude of the [deforming] *Coriolis* forces [indicates the mass flow] *is a function of the mass flow rate* through the conduit.

42. A method of measuring mass flow *rate* as set forth in claim [41] *44* in which the *magnitude of Coriolis* [deforming] forces [are measured by] *tending to* elastically [deforming] *deform* the conduit along the length thereof and around the axis of symmetry substantially perpendicular to the oscillation axis of the conduit; [and] *is determined by* measuring the angular deflection of the conduit around the axis of symmetry;

whereby the angle of deflection [indicates the] *is a function of* mass flow *rate* through the conduit.

43. A method of measuring mass flow *rate* as set forth in claim 42 in which the angle of deflection is determined by measuring the time differential between passage of one portion of the conduit through a plane substantially at the midpoint of the oscillation and the passage of a *symmetrically opposite* second portion of the conduit through such plane.

44. A method of measuring mass flow *rate* as set forth in claim [42] *41* in which the conduit is oscillated at the resonant frequency of the conduit and material therein [.] *and at constant amplitude.*

45. A method of measuring mass flow *rate* as set forth in claim [42] *41* in which a spring arm having a resonant frequency substantially identical to that of the conduit is attached to the conduit adjacent the inlet and outlet portions thereof and oscillated out of phase with *the* conduit.

46. A method of measuring mass flow *rate* as set forth in claim 42 in which the [deforming] *magnitude of Coriolis* forces [are] *is* measured by sensing incipient distortion of the conduit [around] *about* the axis of symmetry substantially perpendicular to the oscillation axis of the conduit;

generating a force opposing the [deforming] *Coriolis* forces in response to the sensed incipient distortion to limit the distortion to the incipient distortion; and measuring the *magnitude of* opposing force to determine mass flow *rate.*

47. A method of measuring mass flow *rate* as set forth in claim 46 in which the incipient distortion is detected by measuring the time differential between passage of one portion of the conduit through a plane substantially at the midpoint of the oscillation and the passage of a *symmetrically opposite* second portion of a conduit through such plane.

48. A method [for] *of* measuring mass flow *rate* as set forth in claim 46 in which the incipient distortion is detected by strain gages mounted on the conduit at positions symmetrical relative to the axis of symmetry.

49. A method of measuring mass flow *rate* as set forth in claim 46 in which the incipient distortion of the conduit is detected by crystals mounted between the conduit and an inertia bar pivotally mounted to the conduit at the axis of symmetry, the crystals being positioned symmetrically relative to the axis of symmetry of the conduit.

[50. A method of measuring mass flow set forth in claim 46 in which the conduit is oscillated at a predetermined amplitude.]

51. A method for measuring *mass* flow *rate* of a material comprising:

flowing the material through a "U" shaped conduit;

oscillating the conduit [around] *about* an axis of oscillation passing through the legs of the conduit at substantially [equal] *right* angles; and measuring the [forces tending to deflect the "U" shaped conduit around a deflection axis perpendicular to the oscillation axis and symmetrical to the conduit] *material mass flow rate* by determining the time lag between the passage of one side of the conduit through a plane substantially at the midpoint of oscillation and the passage of the other side of the conduit through such plane.

52. A method for measuring material *mass* flow *rate* as set forth in claim 51 in which the time lags are measured in both directions of *conduit* oscillation and time [lags] *lag* in one direction of *conduit* oscillation *is* subtracted from time [lags] *lag* in the opposite direction of *conduit* oscillation.

[53. A method for measuring material flow as set forth in claim 52 in which the "U" shaped conduit deflects around the deflection axis and the material flow is measured by determining the net time lags.]

54. A method for measuring material *mass* flow *rate* as set forth in claim 52 in which the "*U*" *shaped conduit is oscillated at a constant amplitude and frequency and the magnitude of* forces, *resulting from the conduit oscillation and fluid flow,* tending to deflect the "U" shaped conduit are measured by generating counterforces thereto in response to the net time lags measured to minimize the time lags, and determining the magnitude of the counterforces to establish the material *mass* flow *rate.*

55. A method for measuring material *mass* flow *rate* as set forth in claim [54] *51* in which the "U" shaped conduit is oscillated [at a substantially constant amplitude] *at resonant frequency.*

*56. A flow meter as set forth in claim 32 in which the resonant frequency of the "U" shaped conduit about said first oscillation axis is lower than the resonant frequency of the "U" shaped conduit about said second deflection axis.*

*57. A flow meter as set forth in claim 38 in which the resonant frequency of the continuous conduit about said oscillation axis is lower than the resonant frequency of the continuous conduit about said axis of symmetry.*

* * * * *

UNITED STATES PATENT AND TRADEMARK OFFICE

CERTIFICATE OF CORRECTION

PATENT NO. : Re. 31,450

DATED : November 29, 1983

INVENTOR(S) : James E. Smith

It is certified that error appears in the above-identified patent and that said Letters Patent is hereby corrected as shown below:

Column 10, line 15, "$M_F$" should read --$M_f$--.

Claim 8, line 11, "]may" should read --[may--.

Claim 12, line 9, "display readout" should read --display for readout--.

Claim 15, line 6, "of the oscillation" should read --of oscillation--.

Claim 24, line 11, "(i)" should read --(ii)--.

Signed and Sealed this

Sixth Day of March 1984

[SEAL]

*Attest:*

GERALD J. MOSSINGHOFF

*Attesting Officer*

*Commissioner of Patents and Trademarks*

UNITED STATES PATENT AND TRADEMARK OFFICE

CERTIFICATE OF CORRECTION

PATENT NO. : Re 31,450

DATED : February 11, 1982 Page 1 of 2

INVENTOR(S) : James E. Smith

It is certified that error appears in the above-identified patent and that said Letters Patent is hereby corrected as shown below:

Col. 10, line 51, after "r" in the expression "$F_{c1}r$" add the subscript --1-- so that the line reads "$\Delta M=F_{c1}r_1 + F_{c2}r_2$"

Col. 10, line 64, delete "unit length" from the expression "$\left(\frac{\text{lbs. Mass}}{\text{unit length}}\right)$"; insert parentheses around "$\frac{\text{lbs. Mass}}{\text{sec}}$" and at the end of the line add --$\Delta$L (unit length)-- so the line reads "$M_1$ (lbs. Mass) . $V_1$ $\frac{\text{unit length}}{\text{sec}} = \Delta Q\left(\frac{\text{lbs. Mass}}{\text{sec}}\right)\Delta L$(unit length)"

Col. 11, line 3, add --$\Delta$L-- at the end of the line so it reads "Thus $\Delta M=4\ Wr_1\Delta Q\Delta L$"

Col. 11, line 5, add --L-- at the end of the line so it reads "$M=\int\Delta M=4Wr_1QL$"

Col. 11, line 6 at end of line insert "and $\Delta$L=incremental length"

Col. 11, line 16, after "$r_1$" add --L-- so the equation set forth in the line reads "$Q=K_s e/4\ Wr_1L$

UNITED STATES PATENT AND TRADEMARK OFFICE

CERTIFICATE OF CORRECTION

PATENT NO. : Re 31,450

DATED : February 11, 1982

INVENTOR(S) : James E. Smith

It is certified that error appears in the above-identified patent and that said Letters Patent is hereby corrected as shown below:

Col. 11, line 38, rewrite the line to read:

$$-- Q = \frac{K_s LW\Delta t}{8Wr_1^2 L} = \frac{K_s}{8r_1^2}\cdot\Delta t \; --.$$

Signed and Sealed this

Twentieth Day of January, 1987

*Attest:*

DONALD J. QUIGG

*Attesting Officer* *Commissioner of Patents and Trademarks*